US006641335B1

(12) United States Patent
Allard

(10) Patent No.: US 6,641,335 B1
(45) Date of Patent: Nov. 4, 2003

(54) EROSION CONTROL ROLLS

(75) Inventor: Douglas Paul Allard, Santa Rosa, CA (US)

(73) Assignee: Kristar Enterprises, Inc., Santa Rosa, CA (US)

( * ) Notice: Subject to any disclaimer, the term of this patent is extended or adjusted under 35 U.S.C. 154(b) by 0 days.

(21) Appl. No.: 09/479,341

(22) Filed: Jan. 7, 2000

(51) Int. Cl.[7] ................................................ E02B 11/00
(52) U.S. Cl. ........................ 405/302.6; 405/15; 405/43; 405/45
(58) Field of Search ............................. 405/43, 45, 47, 405/44, 36, 15, 258.1, 302.6, 302.7

(56) References Cited

U.S. PATENT DOCUMENTS

| | | | |
|---|---|---|---|
| 3,936,380 A | * 2/1976 | Boske | 405/45 |
| 3,946,762 A | * 3/1976 | Green | 405/45 |
| 4,182,581 A | * 1/1980 | Uehara et al. | 405/43 |
| 5,338,131 A | * 8/1994 | Bestmann | 405/15 |
| 5,575,588 A | * 11/1996 | Nakamura | 405/15 |
| 5,595,458 A | * 1/1997 | Grabhorn | 405/258 |
| 5,836,716 A | * 11/1998 | Johnson et al. | 405/43 |

OTHER PUBLICATIONS

American Excelsior Company, Suggested Specification for Excelsior Degradable Sediment Control Rolls (Sep. 1996) (5 pages).

CD43(2) Fiber Rolls, Caltrans Storm Water Quality Handbooks, Construction Contractor's Guide and Specifications (Apr. 1997) (3 pages).

* cited by examiner

Primary Examiner—Heather Shackelford
Assistant Examiner—Frederick Lagman
(74) Attorney, Agent, or Firm—Howrey Simon Arnold & White LLP

(57) ABSTRACT

An erosion control device is described. A walled elongated core member is disclosed having a first open end, a second end, an interior space and one or more openings in the wall communicating the interior space with the exterior of the core member. An outer filter member surrounds the core member. One or both the first and second ends of the core member can be open. One or both of the open ends can comprise couplers or connectors for connecting one core member to one or two complimentary core members. The core member may comprise a flexible plastic pipe, such as high-density polyethylene pipe having a plurality of perforations.

25 Claims, 3 Drawing Sheets

EROSION CONTROL ROLLS

FIELD OF THE INVENTION

The present invention relates to erosion control and more particularly to devices and apparatuses for use in controlling sedimentation and debris flow associated with soil erosion.

BACKGROUND OF THE INVENTION

Controlling soil erosion, such as erosion on slopes in construction sites, and particularly the sedimentation and debris carried in fluid flow on slopes is a continuing problem. Fiber rolls (also known as wattles) are the current industry standard for use in controlling erosion. Fiber rolls are typically made of fibrous materials such as straw or excelsior (shredded wood) made into rolls that are held together with netting. During construction, the rolls are placed across the face of a slope to curtail soil erosion and to dam, direct and/or filter fluid flow as the fluid flows down the slope. Silt fences, generally black porous cloth strung vertically on wooden stakes across a slope, are alternative means of controlling erosion. However, most regulatory agencies now discourage the use of silt fences due to the propensity for silt fences to collapse from high fluid flows and high winds.

Fiber rolls have been found to be more capable of performing the erosion control function than silt fences. However, fiber rolls are deficient in their ability to direct fluid flow in a controlled manner. Moreover, numerous fiber rolls are generally required due to their inherent deficiencies in directing fluid flow as the flow proceeds down a slope. Accordingly, more effective devices and systems are desired for controlling soil erosion.

SUMMARY OF THE INVENTION

The present invention comprises a walled elongated core member having a first open end, a second end, an interior space and one or more openings in the wall communicating the interior space with the exterior of the core member. An outer filter member surrounds the core member. In one embodiment, both the first and second ends of the core member are open. One feature of the present invention is the ability to connect a plurality of core members together. Accordingly, one or both of the open ends can comprise couplers or connectors for connecting one core member to one or two complimentary core members. The core member may comprise a flexible plastic pipe, such as high-density polyethylene pipe having a plurality of perforations.

In another embodiment, the couplers can comprise tee connectors or elbow connectors. One advantage of the present invention is the ability to connect outlet pipes to tee or elbow connectors for directing fluid flow received by the core members to desired locations downstream of the core members.

The outer filter member may comprises a fiber roll. In one embodiment the fiber roll comprises excelsior or straw. In another embodiment, the filter member may comprise a porous foam material. A porous covering material, such as a woven cloth or netting may surround the outer filter member.

DETAILED DESCRIPTION OF THE INVENTION

The present invention is directed to an apparatus for use in controlling sedimentation and debris flow, especially on slopes. The present invention is particularly useful in controlling erosion resulting from sedimentation and debris flow on slopes in construction sites and other areas where soil erosion poses environmental issues.

Figure 1:
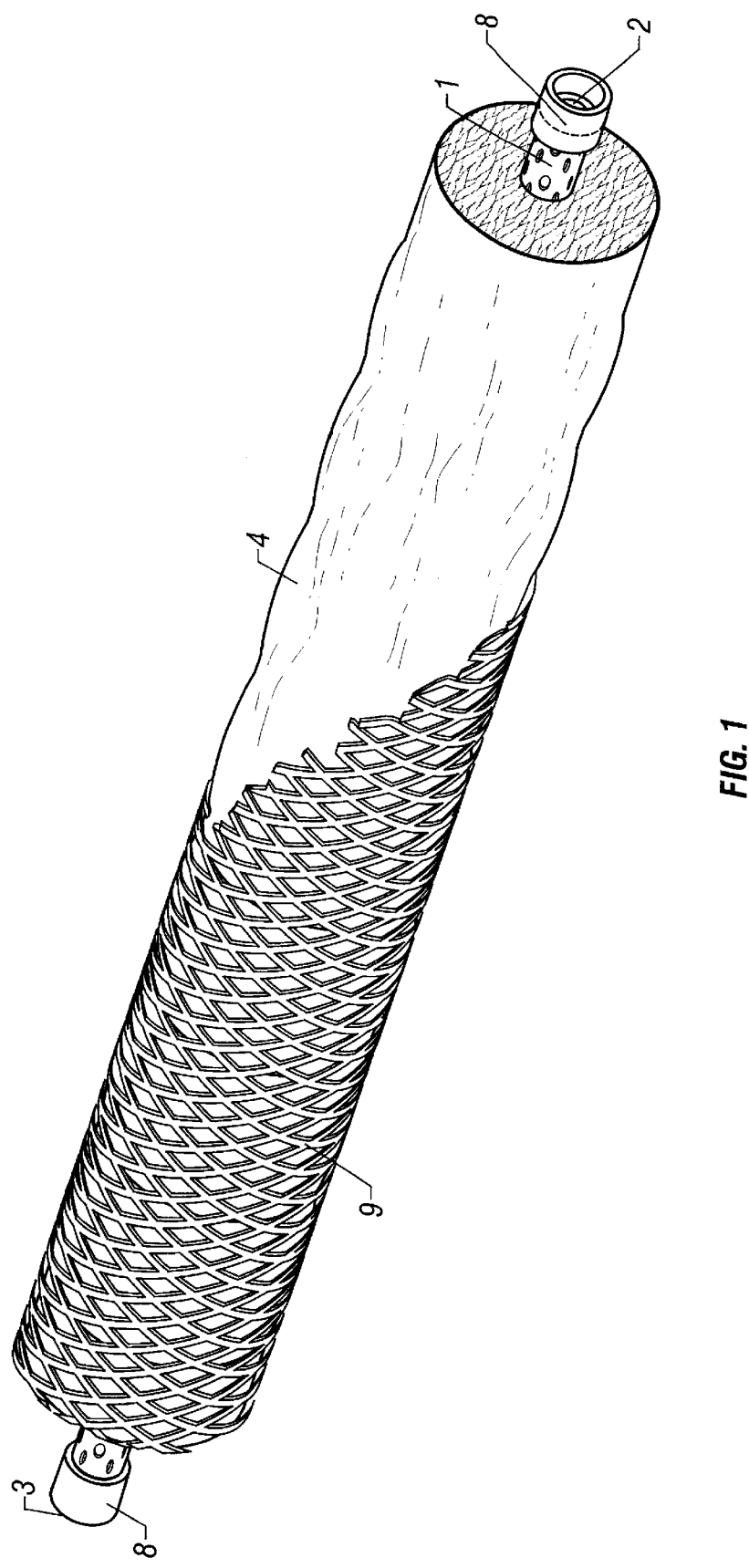
FIG. 1 is a perspective view of one embodiment of the present invention.

Referring to FIG. 1, one embodiment of the present invention is shown having a walled elongated core member 1, a first open end 2 and a second open end 3. The elongated member has an interior space and one or more openings in the wall communicating the interior space with the exterior of the core member. An outer filter member 4 surrounds the core member. In a preferred embodiment, both the first and second ends of the core member are open. One feature of the present invention is the ability to connect a plurality of core members together. Accordingly, one or both of the open ends can comprise couplers or connectors 8 for connecting one core member to one or two complimentary core members. The core member may comprise a flexible plastic pipe, such as high-density polyethylene pipe having a plurality of perforations. The connectors can be standard industry connectors or couplers for coupling piping such that the connected piping is in fluid communication with each other.

Figure 2:
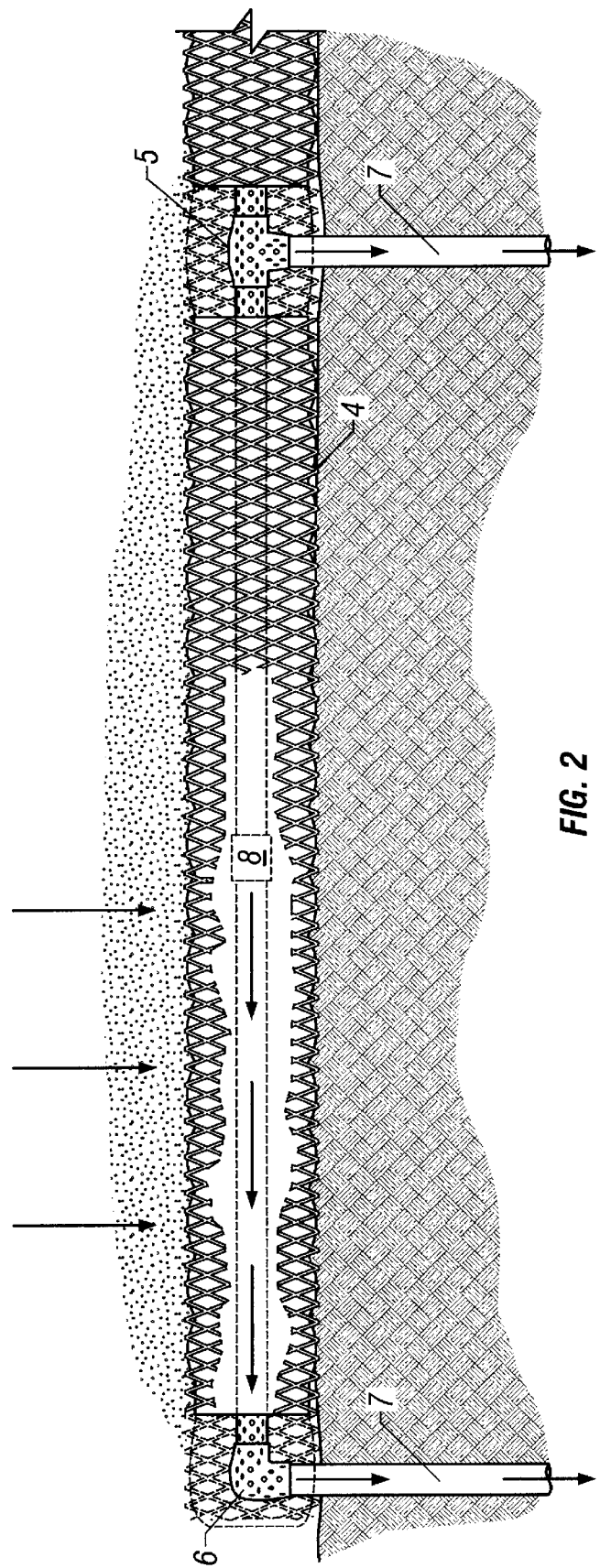
FIG. 2 is a front view of one embodiment of the present invention showing core members interconnected to each other and to outlet pipes.

Referring to FIG. 2, the couplers can comprise tee connectors 5 or elbow connectors 6. One advantage of the present invention is the ability to connect outlet pipes 7 to tee or elbow connectors for directing fluid flow received by the core members to desired locations downstream of the core members.

The outer filter member may comprise a fiber roll. In one embodiment the fiber roll comprises excelsior or straw. Referring again to FIG. 1, the filter member may comprise a porous foam material. As discussed, a porous covering material 9, such as a woven cloth or netting may surround the outer filter member. In a preferred embodiment wherein a plurality of core members are interconnected, the outer filter material will cover the couplers or connectors as well.

Figure 3:
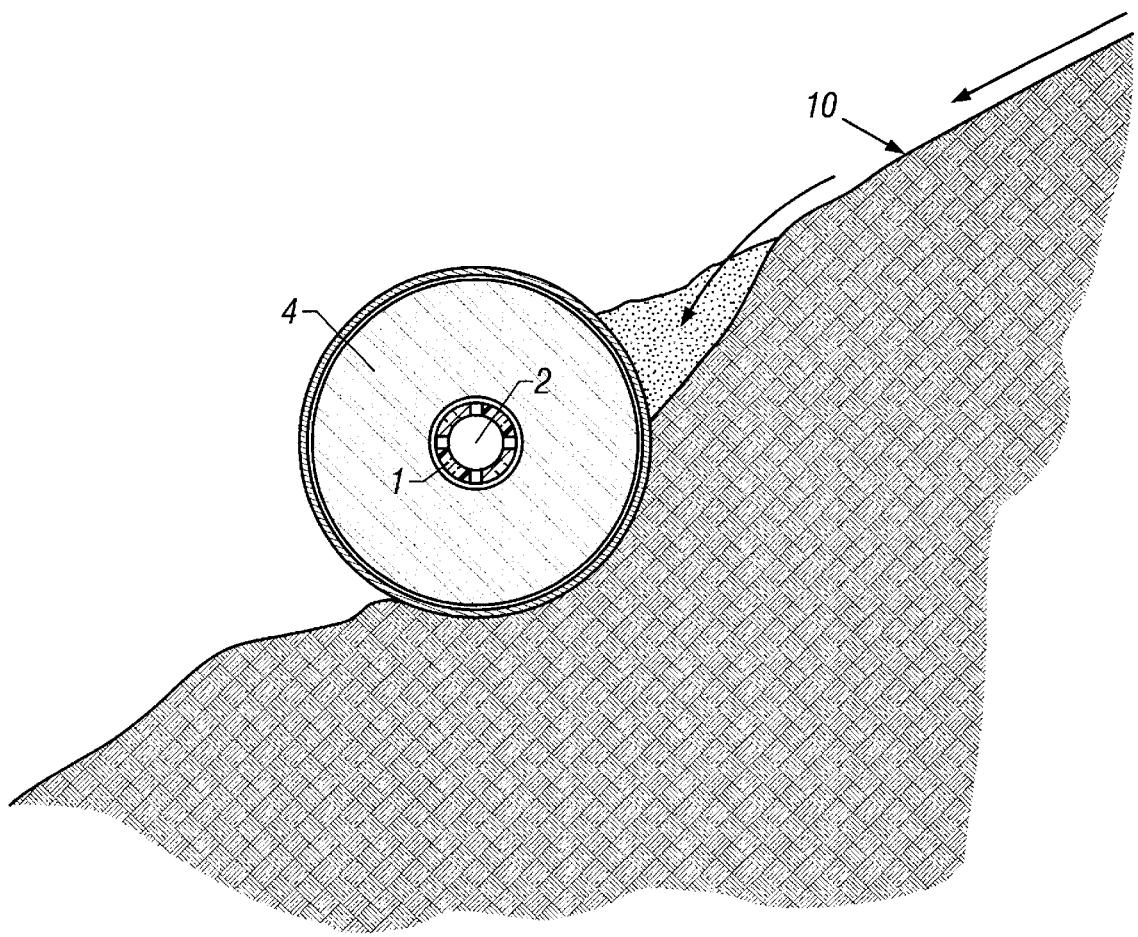
FIG. 3 is a side view of one embodiment of the present invention illustrating the placement of the core member and filter member on a slope.

Referring to FIG. 3, in practicing one embodiment of the invention, the core member 1 surrounded by the outer filter member 4 may be placed on a slope 10. Fluid carrying sedimentation or debris encounters the filter member. Fluid, debris and sedimentation not retained by the filter material enters the core member via one or more openings or perforations and is routed out of one or both ends of the core member. To retain the core member and filter member in the desired location, the slope may be notched. For example, for a core member having a 2 to 4 inch diameter, the slope may be notched to a depth of approximately three inches.

Numerous other variations and embodiments can be discerned from the above detailed description of the invention and illustrations thereof, and all such variations are encompassed within the scope and spirit of the present invention.

What is claimed is:

1. A soil erosion control apparatus for use above ground, comprising:

(a) a walled elongated core member having a first open end comprising a coupler, a second end, an interior space and one or more openings in said wall communicating said interior space with the exterior of said core member; and (b) an outer filter member surrounding said core member and said coupler, wherein said walled elongated core member and said outer filter member both reside above ground.

2. The apparatus of claim 1 wherein said second end is open.

3. The apparatus of claim 2 wherein said first open end and said second open end comprise couplers.

4. The apparatus of claim 1 further comprising a second elongated core member having a first open end comprising a coupler coupled to said coupler of said first elongated core member.

5. The apparatus of claim 1 wherein said coupler is a tee connector.

6. The apparatus of claim 5 further comprising an outlet pipe coupled to said tee connector.

7. The apparatus of claim 1 wherein said coupler is an elbow connector.

8. The apparatus of claim 7 wherein an outlet pipe is coupled to said elbow connector.

9. The apparatus of claim 1 wherein said walled elongated core member comprises a pipe.

10. The apparatus of claim 9 wherein said pipe comprises a flexible plastic.

11. The apparatus of claim 10 wherein said pipe is a high-density polyethylene pipe.

12. The apparatus of claim 1 wherein said second end is open.

13. A soil erosion control apparatus for use above ground, comprising:
   (a) a perforated hollow pipe having a first open end having a coupler attached thereto and a second end; and
   (b) an outer filter member surrounding said perforated hollow pipe and said coupler, wherein said outer filter member is formed from one or more materials selected from the group consisting of excelsior, straw and a porous foam material, and wherein said walled elongated core member and said outer filter member both reside above ground.

14. The apparatus of claim 13 further comprising a porous outer material surrounding said outer filter member.

15. The apparatus of claim 14 wherein said porous outer material comprises netting.

16. A soil erosion control apparatus for use above ground, comprising:
   (a) a first walled elongated core member having a first open end having a coupler attached thereto, a second end, an interior space and one or more openings in said wall communicating said interior space with the exterior of said core member;
   (b) a second walled elongated core member having a first open end having a coupler attached thereto and coupled to said coupler of said first walled core member, a second end, an interior space and one or more openings in said wall communicating said interior space with the exterior of said core member; and
   (c) an outer filter member surrounding said first core member, said second core member, and one or more of said couplers, wherein said outer filter member is formed from one or more materials selected from the group consisting of excelsior, straw and a porous foam material, wherein said walled elongated core members and said outer filter member all reside above ground.

17. A soil erosion control apparatus for use above ground, comprising:
   (a) a walled elongated core member having a first open end comprising a coupler, a second end, an interior space and one or more openings in said wall communicating said interior space with the exterior of said core member; and
   (b) an outer filter member surrounding said core member and said coupler, wherein said outer filter member comprises a porous foam material, and wherein said walled elongated core member and said outer filter member both reside above ground.

18. A soil erosion controlling wattle, comprising:
   (a) a walled elongated core member having a first open end comprising a coupler, a second end, an interior space and one or more openings in said wall communicating said interior space with the exterior of said core member; and
   (b) an outer filter member surrounding said core member and said coupler, said outer filter member capable of curtailing soil erosion and of passing fluid into said core member.

19. The soil erosion controlling wattle of claim 18 further comprising a second elongated core member having a first open end coupled to said coupler.

20. The soil erosion controlling wattle of claim 19 wherein said second elongated core member further comprises a coupler coupled to said coupler of said first elongated core member.

21. The soil erosion controlling wattle of claim 18 wherein said outer filter member is formed from one or more materials selected from the group consisting of excelsior, straw and a porous foam material.

22. A soil erosion controlling wattle, comprising:
   (a) a walled elongated core member having a first open end comprising a coupler, a second end, an interior space and one or more openings in said wall communicating said interior space with the exterior of said core member; and
   (b) an outer filter member surrounding said core member and said coupler, said outer filter member capable of curtailing soil erosion and of passing fluid into said core member, wherein said walled elongated core member and said outer filter member both reside above ground.

23. The soil erosion controlling wattle of claim 22 further comprising a second elongated core member having a first open end coupled to said coupler.

24. The soil erosion controlling wattle of claim 23 wherein said second elongated core member further comprises a coupler coupled to said coupler of said first elongated core member.

25. The soil erosion controlling wattle of claim 22 wherein said outer filter member is formed from one or more materials selected from the group consisting of excelsior, straw and a porous foam material.

* * * * *

UNITED STATES PATENT AND TRADEMARK OFFICE
CERTIFICATE OF CORRECTION

PATENT NO. : 6,641,335 B1 Page 1 of 1
DATED : November 4, 2003
INVENTOR(S) : Douglas P. Allard It is certified that error appears in the above-identified patent and that said Letters Patent is hereby corrected as shown below:

<u>Column 3,</u>
Line 27, please change "claim 1" to -- claim 13 --

Signed and Sealed this

Second Day of March, 2004

JON W. DUDAS
*Acting Director of the United States Patent and Trademark Office*